(12) United States Patent
Hurtado Perez et al.

(10) Patent No.: US 12,473,199 B2
(45) Date of Patent: Nov. 18, 2025

(54) CO-PRODUCTION OF HYDROGEN, CARBON, ELECTRICITY, AND CARBON MONOXIDE WITH CARBON DIOXIDE CAPTURE FOR REFINING OF CRUDE OIL

(71) Applicant: Saudi Arabian Oil Company, Dhahran (SA)

(72) Inventors: Omar David Hurtado Perez, Dhahran (SA); Sai P. Katikaneni, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 655 days.

(21) Appl. No.: 17/954,945

(22) Filed: Sep. 28, 2022

(65) Prior Publication Data
US 2024/0101415 A1    Mar. 28, 2024

(51) Int. Cl.
*C01B 3/32* (2006.01)
*C01B 3/24* (2006.01)
(Continued)

(52) U.S. Cl.
CPC .......... *C01B 3/326* (2013.01); *C01B 3/24* (2013.01); *C01B 32/50* (2017.08); *C25B 1/04* (2013.01);
(Continued)

(58) Field of Classification Search
CPC  C01B 3/326; C01B 3/24; C01B 32/50; C01B 2203/0233; C01B 2203/0238; C01B 2203/043; C01B 2203/0475; C01B 2203/061; C01B 2203/067; C01B 2203/0883; C01B 2203/84; C01B 2203/044; C01B 2203/047; C01B 2203/049; C01B 2203/066;
(Continued)

(56) References Cited

U.S. PATENT DOCUMENTS

| 2,640,760 | A | 6/1953 | Hem |
| 4,160,479 | A | 7/1979 | Richardson et al. |

(Continued)

FOREIGN PATENT DOCUMENTS

| DE | 102014011213 A1 | 2/2016 |
| WO | WO 2020092368 A1 | 5/2020 |

OTHER PUBLICATIONS

U.S. Appl. No. 17/730,942, filed Apr. 27, 2022, Pham et al.
(Continued)

*Primary Examiner* — Andrew J. Oyer
(74) *Attorney, Agent, or Firm* — Fish & Richardson P.C.

(57) ABSTRACT

A crude oil is processed to form a hydrocarbon feed stream. The hydrocarbon feed stream is exposed to heat in an absence of oxygen to the convert the hydrocarbon feed stream into a solids stream and a gas stream. The gas stream is separated into an exhaust gas stream and a first hydrogen stream. The carbon is separated from the solids stream to produce a carbon stream. Electrolysis is performed on a water stream to produce an oxygen stream and a second hydrogen stream. At least a portion of the oxygen of the oxygen stream and a second portion of the carbon of the carbon stream are combined to generate power and a carbon dioxide stream. The carbon dioxide is used in dry reforming to produce syngas.

20 Claims, 10 Drawing Sheets

(51) Int. Cl.
*C01B 32/50* (2017.01)
*C25B 1/04* (2021.01)

(52) U.S. Cl.
CPC .......... *C01B 2203/0233* (2013.01); *C01B 2203/0238* (2013.01); *C01B 2203/043* (2013.01); *C01B 2203/0475* (2013.01); *C01B 2203/061* (2013.01); *C01B 2203/067* (2013.01); *C01B 2203/0883* (2013.01); *C01B 2203/84* (2013.01)

(58) Field of Classification Search
CPC ...... C01B 2203/085; C01B 2203/0861; C01B 2203/1047; C01B 2203/1052; C01B 2203/1058; C01B 2203/1064; C01B 3/02; C01B 3/384; C25B 1/04; Y02P 20/129
See application file for complete search history.

(56) References Cited

U.S. PATENT DOCUMENTS

| | | | |
|---|---|---|---|
| 7,163,758 B2 | 1/2007 | Meyer | |
| 9,249,064 B2 | 2/2016 | Kumar et al. | |
| 9,394,171 B2 | 7/2016 | Keefer et al. | |
| 2004/0265651 A1* | 12/2004 | Steinberg | C01B 3/24 429/495 |
| 2006/0024538 A1* | 2/2006 | Steinberg | H01M 8/1246 429/495 |
| 2007/0131909 A1 | 6/2007 | Rojey et al. | |
| 2010/0251615 A1* | 10/2010 | Marker | C10G 3/50 585/240 |
| 2011/0014526 A1* | 1/2011 | Gur | H01M 8/0643 429/405 |
| 2011/0120137 A1* | 5/2011 | Ennis | H01M 8/04082 60/39.182 |
| 2013/0035528 A1* | 2/2013 | Marker | C10G 1/002 585/242 |
| 2022/0052364 A1 | 2/2022 | Reid et al. | |

OTHER PUBLICATIONS

U.S. Appl. No. 17/731,062, filed Apr. 27, 2022, Pham et al.
U.S. Appl. No. 17/954,746, filed Sep. 28, 2022, Perez et al.
Adnan et al., "Biomass upgrading to high-value chemicals via gasification and electrolysis: A thermodynamic analysis," Renewable Energy, 2020, 162:1367-1379, 13 pages.
Badwal et al., "The Holy Grail of Carbon Combustion—The Direct Carbon Fuel Cell Technology," Materials Forum, Institute of Materials Engineering Australasia Ltd., 2010, 34, 5 pages.
Cao et al., "Direct carbon fuel cell: Fundamentals and recent developments," Journal of Power Sources, 2007, 167, 8 pages.
Dewil et al., "CFB cyclones at high temperature: Operational results and design assessment," Patricuology, Jun. 2008, 6(3):149-156, 8 pages.
Giddey et al., "A comprehensive review of direct carbon fuel cell technology," Progress in Energy and Combustion Science, 2012, 38:360-399, 40 pages.
Irena, "Green Hydrogen Cost Reduction," International Renewable Energy Agency, 2020, 106 pages.
Jang et al., "A review on dry reforming of methane in aspect of catalytic properties," Catalysis Today, 2019, 324:15-26, 12 pages.
Jiang et al., "Insight into graphite oxidation in a NiO-based hybrid direct carbon fuel cell," International Journal of Hydrogen Energy, Elsevier, 2019, 10 pages.
Ju et al., "Enhanced anode interface for electrochemical oxidation of solid fuel in direct carbon fuel cells: The role of liquid Sn in mixed state," Journal of Power Sources, Jan. 2012, 198(15):36-41, 6 pages.
madehow.com [online], "How aluminum is made—material, manufacture, making, used, processing, aluminum, composition, product," available on or before Mar. 26, 2006 via Internet Archive Wayback Machine URL<https://web.archive.org/web/20060326043505/http://www.madehow.com/Volume-5/Aluminum.html>, retrieved Jul. 20, 2022, retrieved from URL <http://www.madehow.com/Volume-5/Aluminum.html#:~:text=The%20Manufacturing-,Process,oxide%20to%20release%20pure%20aluminum.>, 5 pages.
netl.doe.gov [online], "Oxy-Combustion," available on or before Oct. 18, 2020 via Internet Archive Wayback Machine URL <https://web.archive.org/web/20201018085519/https://netl.doe.gov/node/7477>, retrieved Jul. 1, 2022, retrieved from URL <https://netl.doe.gov/node/7477#:~:text=In%20high%2Dtemperature%20oxy%2Dfuel%2Cradiant%20zone%20of%20the%20boiler>, 2 pages.
researchgate.net [online], "High-temperature micro filters," Jun. 2016, retrieved Jul. 1, 2022, retrieved from URL<https://www.researchgate.net/post/High-temperature_micro_filters>, 5 pages.
Schneider et al., "State of the Art of Hydrogen Production via Pyrolysis of Natural Gas," ChemoBioEng Reviews, 2020, 7(5):150-158, 9 pages.
Sciencedirect.com [online], "Aluminum Carbides—an overview," Science Direct Topics Page, 2003-2022, retrieved Jul. 20, 2022, retrieved from URL <https://www.sciencedirect.com/topics/earth-and-planetary-sciences/aluminum-carbides#:~:text=Aluminum%20carbide%20(A14C3)%2C%20in%20the%20form,aluminum%20at%20800%20%C2%BOC.>, 17 pages.
Ursua et al, "Hydrogen production from water electrolysis: Current status and future trends," Proceedings of the IEEE, Feb. 2012, 100(2):410-426, 17 pages.
World-aluminium.org [online], "Aluminium for Future Generations—Anode Production," 2018, retrieved on Jul. 20, 2022, retrieved from URL <https://primary.world-aluminium.org/processes/anode-production/>, 2 pages.
Xu et al., "Perspectives for low-temperature waste heat recovery," Energy, 2019, 176:1037-1043, 7 pages.
SAIP Examination Report in Saudi Arabian Appln No. 123450433, dated Sep. 26, 2024, 17 pages with English translation.

\* cited by examiner

151

CO-PRODUCTION OF HYDROGEN, CARBON, ELECTRICITY, AND CARBON MONOXIDE WITH CARBON DIOXIDE CAPTURE FOR REFINING OF CRUDE OIL

TECHNICAL FIELD

This disclosure relates to co-production of hydrogen, carbon, and electricity for carbon monoxide production for refining of crude oil.

BACKGROUND

Carbon is an abundant element in the Earth's crust. Carbon's abundance, its diversity in the makeup of organic compounds, and its ability to form polymers at temperatures commonly encountered on Earth allows this element to serve as a common element of all known life. The atoms of carbon can bond together in numerous ways, resulting in various allotropes of carbon. Some examples of allotropes of carbon include graphite, diamond, amorphous carbon, carbon nanotubes, carbon fibers, and fullerenes. The physical properties of carbon vary widely based on the allotropic form. As such, carbon is widely used across various markets at commercial or near-commercial scales.

Hydrogen is the lightest element. At standard conditions, hydrogen is a gas of diatomic molecules and is colorless, odorless, tasteless, non-toxic, and combustible. Hydrogen is the most abundant chemical substance in the universe. Most of the hydrogen on Earth exists in molecular forms, such as in water and in organic compounds (such as hydrocarbons). Some examples of uses of hydrogen include fossil fuel processing (for example, hydrocracking) and ammonia production.

There is a growing interest in the energy transition from fossil fuels to renewable energy and sustainable energy in a global effort to reduce carbon emissions. Some examples of decarbonization pathways in the energy transition to renewable energy include increasing energy efficiency, producing and/or using lower-carbon fuels, and carbon capture and storage (CCS).

SUMMARY

This disclosure describes technologies relating to co-production of hydrogen, carbon, electricity, and carbon monoxide along with sequestration-ready carbon dioxide. Certain aspects of the subject matter described can be implemented as a method. Crude oil is processed to separate the crude oil into a liquid hydrocarbon stream, a first gas stream, and a first solids stream. The first solids stream includes carbon. The first gas stream includes hydrogen and one or more hydrocarbons, such as methane. A first portion of the first gas stream and the liquid hydrocarbon stream are combined to form a hydrocarbon feed stream. The hydrocarbon feed stream is exposed to heat in an absence of oxygen to convert the hydrocarbon feed stream into a second solids stream and a second gas stream. The hydrocarbon feed stream includes a hydrocarbon. The second solids stream includes carbon. The second gas stream includes hydrogen. The second gas stream is separated into an exhaust gas stream and a first hydrogen stream. The first hydrogen stream includes at least a portion of the hydrogen from the gas stream. The carbon is separated from the second solids stream to produce a carbon stream. Electrolysis is performed on a water stream to produce an oxygen stream and a second hydrogen stream. The water stream includes water. The oxygen stream includes oxygen. The second hydrogen stream includes hydrogen. At least a portion of the oxygen of the oxygen stream and a second portion of the carbon of the carbon stream are combined to generate power and a carbon dioxide stream. The carbon dioxide stream includes carbon dioxide. The carbon dioxide stream and a second portion of the first gas stream are contacted with a dry reforming catalyst under dry reforming conditions to form a syngas stream. The syngas stream includes carbon monoxide and hydrogen. A first portion of the generated power is used to perform electrolysis on the water stream. A second portion of the generated power is used to expose the hydrocarbon feed stream to heat. A third portion of the generated power is used to provide heat to produce the dry reforming conditions. In some implementations, at least a portion of the generated power is used onsite or offsite for another process that may require heat and/or electricity.

This, and other aspects, can include one or more of the following features. The hydrocarbon feed stream can include one or more C1-C22 alkanes, one or more C1-C22 alkenes, or any combination of these. The dry reforming conditions comprise a dry reforming temperature in a range of from about 400 degrees Celsius (° C.) to about 1,000° C. The oxygen and the carbon can be combined, for example, by a direct carbon fuel cell (DCFC) that includes a solid oxide. The oxygen and the carbon can be combined by the direct carbon fuel cell at an operating temperature in a range of from about 550° C. to about 900° C. Heat can be transferred by a first waste heat recovery heat exchanger from the gas stream to a buffer fluid. Heat can be transferred by a second waste heat recovery heat exchanger from the buffer fluid to the hydrocarbon feed stream prior to exposing the hydrocarbon feed stream to heat in the absence of oxygen. Power can be generated by a Rankine cycle using the heat transferred from the second gas stream to the buffer stream. Generating power by the Rankine cycle can include transferring heat from the buffer fluid to a working fluid in a boiler to vaporize the working fluid into a vaporized working fluid. Generating power by the Rankine cycle can include flowing and expanding the vaporized working fluid through a turbine to generate the power. Generating power by the Rankine cycle can include condensing the vaporized working fluid into a condensed working fluid. Generating power by the Rankine cycle can include circulating the condensed working fluid to the boiler. Heat can be transferred by a first waste heat recovery heat exchanger from the carbon dioxide stream to a buffer fluid. Heat can be transferred by a second waste heat recovery heat exchanger from the buffer fluid to the hydrocarbon feed stream prior to exposing the hydrocarbon feed stream to heat in the absence of oxygen. The carbon dioxide stream generated by the direct carbon fuel cell can be sequestered within a subterranean formation, such that the carbon dioxide stream is not released to the atmosphere.

Certain aspects of the subject matter described can be implemented as a system. The system includes a crude oil stream, a hydrocarbon processing unit, a pyrolysis chamber, a gas separation unit, a carbon separation unit, a water stream, an electrolysis unit, a dry reforming unit, and a power generation unit. The hydrocarbon processing unit is configured to receive and process the crude oil stream to separate the crude oil stream into a liquid hydrocarbon stream, a first gas stream, and a first solids stream. The first solids stream includes carbon. The first gas stream includes hydrogen and methane. The hydrocarbon feed stream includes a hydrocarbon. The pyrolysis chamber is configured to receive the liquid hydrocarbon stream and a first portion of the first gas stream and expose the liquid hydrocarbon stream and the first portion of the first gas stream to heat in an absence of oxygen for conversion into a second solids stream and a second gas stream. The second solids stream includes carbon. The second gas stream includes hydrogen. The gas separation unit is configured to receive the second gas stream from the pyrolysis chamber and separate the hydrogen from the second gas stream to produce an exhaust gas stream and a first hydrogen stream. The first hydrogen stream includes at least a portion of the hydrogen from the second gas stream. The carbon separation unit is configured to receive the second solids stream from the pyrolysis chamber and separate the carbon from the second solids stream to produce a carbon stream. The water stream includes water. The electrolysis unit is configured to receive the water stream and electrical power. The electrolysis unit is configured to use the electrical power to perform electrolysis on the water stream to produce an oxygen stream and a second hydrogen stream. The oxygen stream includes oxygen. The second hydrogen stream includes hydrogen. The dry reforming unit is configured to receive the carbon dioxide stream from the power generation unit and a second portion of the first gas stream from the hydrocarbon processing unit. The dry reforming unit is configured to contact the carbon dioxide stream and the second portion of the first gas stream with a dry reforming catalyst under dry reforming conditions to form a syngas stream. The syngas stream includes carbon monoxide and hydrogen. The power generation unit is configured to receive at least a portion of the oxygen stream from the electrolysis unit and a second portion of the carbon stream from the carbon separation unit. The power generation unit includes a direct carbon fuel cell. The direct carbon fuel cell is configured to combine the oxygen from the portion of the oxygen stream and the carbon from the portion of the carbon stream to generate power and a carbon dioxide stream. The carbon dioxide stream includes carbon dioxide. A first portion of the power generated by the power generation unit is provided to the electrolysis unit to perform electrolysis on the water stream. A second portion of the power generated by the power generation unit is provided to the pyrolysis chamber to expose the liquid hydrocarbon stream and the first portion of the first gas stream to heat. A third portion of the power generated by the power generation unit is provided to the dry reforming unit to produce the dry reforming conditions.

This, and other aspects can include one or more of the following features. The hydrocarbon feed stream can include one or more C1-C22 alkanes, one or more C1-C22 alkenes, or any combination of these. The dry reforming conditions comprise a dry reforming temperature in a range of from about 400° C. to about 1,000° C. The direct carbon fuel cell can include a solid oxide electrolyte that is configured to operate at a temperature in a range of from about 550° C. to about 900° C. The system can include a first waste heat recovery heat exchanger. The first waste heat recovery heat exchanger can be in fluid communication with the gas stream exiting the pyrolysis chamber. The first waste heat recovery heat exchanger can be in fluid communication with a buffer fluid. The first waste heat recovery heat exchanger can be configured to transfer heat from the gas stream to the buffer fluid. The system can include a second waste heat recovery heat exchanger. The second waste heat recovery heat exchanger can be in fluid communication with the hydrocarbon feed stream entering the pyrolysis chamber. The second waste heat recovery heat exchanger can be in fluid communication with the buffer fluid. The second waste heat recovery heat exchanger can be configured to transfer the heat from the buffer fluid to the hydrocarbon feed stream prior to the hydrocarbon feed stream entering the pyrolysis chamber. The system can include a Rankine cycle that is configured to generate power using the heat transferred from the second gas stream to the buffer fluid. The Rankine cycle can include a boiler that is configured to receive a working fluid and the buffer fluid. The boiler can be configured to transfer heat from the buffer fluid to the working fluid to vaporize the working fluid into a vaporized working fluid. The Rankine cycle can include a turbine that is configured to receive the vaporized working fluid and generate power as the vaporized working fluid flows and expands through the turbine. The Rankine cycle can include a condenser that is configured to receive and condense the vaporized working fluid into a condensed working fluid. The Rankine cycle can include a pump that is configured to circulate the condensed working fluid to the boiler. The system can include a first waste heat recovery heat exchanger. The first waste heat recovery heat exchanger can be in fluid communication with carbon dioxide stream exiting the power generation unit. The first waste heat recovery heat exchanger can be in fluid communication with a buffer fluid. The first waste heat recovery heat exchanger can be configured to transfer heat from the carbon dioxide stream to the buffer fluid. The system can include a second waste heat recovery heat exchanger. The second waste heat recovery heat exchanger can be in fluid communication with the hydrocarbon feed stream entering the pyrolysis chamber. The second waste heat recovery heat exchanger can be in fluid communication with the buffer fluid. The second waste heat recovery heat exchanger can be configured to transfer the heat from the buffer fluid to the hydrocarbon feed stream prior to the hydrocarbon feed stream entering the pyrolysis chamber. The pyrolysis chamber can include a catalyst. The catalyst can include at least one of activated carbon, carbon black, cobalt, iron, copper, or nickel.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a system for the co-production of hydrogen, oxygen, carbon, carbon monoxide, carbon dioxide, and electricity for refining of crude oil. The two main feeds to the system include a hydrocarbon stream and a water stream. In some implementations, renewable electricity and/or electricity from a power grid is used as necessary. The hydrocarbon stream is pyrolyzed to produce carbon and hydrogen. The water stream is split via electrolysis to produce oxygen and hydrogen. Power can be generated by (i) burning carbon in the presence of oxygen (sourced from electrolysis of the water stream) to produce heat which can be used to generate steam for a steam turbine, (ii) combining the carbon (sourced from pyrolysis of the hydrocarbon stream) and the oxygen (sourced from electrolysis of the water stream) using a direct carbon fuel cell (DCFC), or both (i) and (ii). In some implementations, waste heat recovery is implemented for process integration and efficiency optimization. The carbon dioxide produced by the system is sequestration-ready in that it is ready for transport (for example, by a pipeline) to be sequestered in a subterranean zone in the Earth as opposed to being released to the atmosphere and contributing to carbon emissions.

The subject matter described in this disclosure can be implemented in particular implementations, so as to realize one or more of the following advantages. Carbon dioxide, which may be produced as a by-product, can be sequestered and/or used in another industrial process instead of being released to the atmosphere. The system is flexible in that it can receive a range of feedstocks, such as conventional hydrocarbons (for example, natural gas, crude oil, and/or their derivatives), biogas, bio-liquid fuels, or oil waste. The systems described herein can be implemented to utilize excess solid carbon products resulting from pyrolysis, which otherwise may be difficult to place in carbon markets, also while addressing the intermittency of renewable energy sources. For example, a portion of the carbon produced by the system can be used as an energy storage medium while another portion of the carbon produced by the system can be sold on the market as a feedstock for another industrial process. For example, the carbon produced by the system can be used to form carbon black, synthetic graphite, carbon filaments/fiber, and/or carbon nanostructures (such as carbon nanotubes or carbon nanofibers). For example, a portion of the carbon produced by the system can be used for power generation.

Figure 1A:
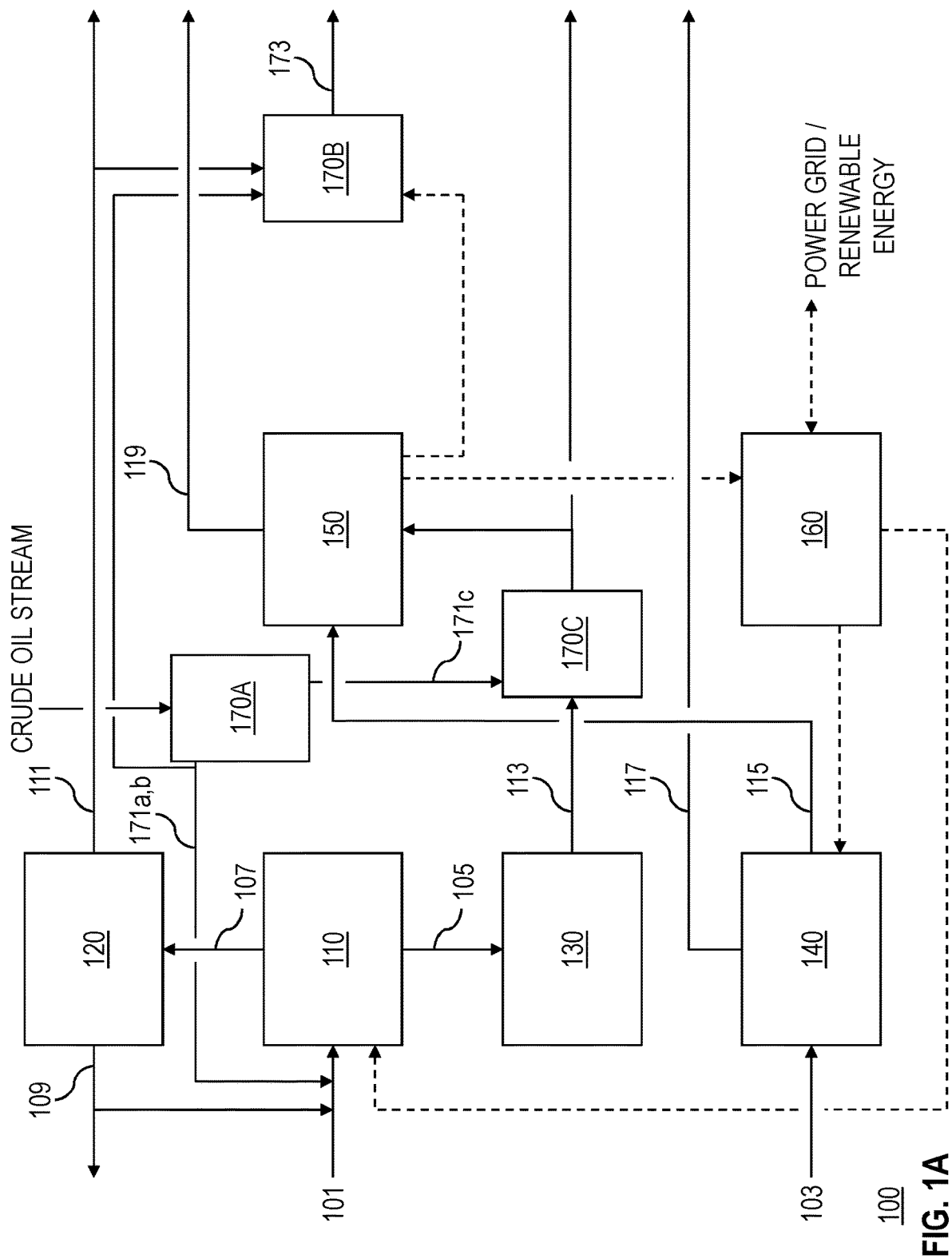
FIG. 1A is a schematic diagram of an example system for co-production of hydrogen, carbon, electricity, and carbon monoxide.

FIG. 1A is a schematic diagram of an example system 100 for co-production of hydrogen, carbon, carbon monoxide, and electricity. The system 100 includes a hydrocarbon feed stream 101. The hydrocarbon feed stream 101 includes a hydrocarbon (for example, an alkane, an alkene, an alkyne, a cyclic hydrocarbon, an aromatic hydrocarbon, and/or a non-aromatic hydrocarbon). In some implementations, the hydrocarbon feed stream 101 includes multiple hydrocarbons. For example, the hydrocarbon feed stream 101 can include one or more C1-C22 alkanes (that is, alkanes having a number of carbon atoms in a range of from 1 to 22), one or more C1-C22 alkenes (that is, alkenes having a number of carbon atoms in a range of from 1 to 22), or any combination of these. In some implementations, the hydrocarbon feed stream 101 also includes components other than hydrocarbon(s), such as hydrogen. However, the hydrocarbon feed stream 101 does not include oxygen-containing components. The system 100 includes a water stream 103 that includes water (that is, $H_2O$).

The system 100 includes a pyrolysis chamber 110, a gas separation unit 120, a carbon separation unit 130, an electrolysis unit 140, a power generation unit 150, a hydrocarbon processing unit 170A, and a dry reforming unit 170B. The hydrocarbon processing unit 170A is configured to receive and process a crude oil stream 171 to separate the crude oil stream 171 in a liquid hydrocarbon stream 171a, a first gas stream 171b, and a first solids stream 171c. The first gas stream 171b includes hydrogen and one or more hydrocarbons, such as methane. The first solids stream 171c includes carbon. The liquid hydrocarbon stream 171a and the first gas stream 171b can be combined with the hydrocarbon feed stream 101. In some implementations, the combination of the liquid hydrocarbon stream 171a and the first gas stream 171b form the hydrocarbon feed stream 101. The hydrocarbon processing unit 170A can include typical equipment used in crude oil refining. For example, the hydrocarbon processing unit 170A can include a distillation column and a hydrocracker.

The pyrolysis chamber 110 is configured to receive the hydrocarbon feed stream 101. The pyrolysis chamber 110 is configured to expose the hydrocarbon feed stream 101 to heat in an absence of oxygen to convert the hydrocarbon feed stream 101 into a solids stream 105 and a gas stream 107. In some implementations, depending on the composition of the hydrocarbon feed stream 101, the pyrolysis chamber 110 may also produce a liquid (for example, bio-oil) that exits the pyrolysis chamber 110 with the solids stream 105. The solids stream 105 includes carbon. The gas stream 107 includes hydrogen. In some implementations, the gas stream 107 includes carbon (for example, small particulates entrained in the gas stream 107), unconverted hydrocarbons from the hydrocarbon feed stream 101, or both. In some implementations, the pyrolysis chamber 110 is configured to pyrolyze the hydrocarbon feed stream 101 without the use of a catalyst (non-catalytic pyrolysis). In some implementations, the pyrolysis chamber 110 is configured to pyrolyze the hydrocarbon feed stream 101 with the use of a catalyst (catalytic pyrolysis).

The gas separation unit 120 is configured to receive the gas stream 107 from the pyrolysis chamber 110. The gas separation unit 120 is configured to separate the hydrogen from the gas stream 107 to produce an exhaust gas stream 109 and a first hydrogen stream 111. The first hydrogen stream 111 includes at least a portion of the hydrogen from the gas stream 107. In some implementations, the first hydrogen stream 111 includes substantially all of the hydrogen from the gas stream 107. In some implementations, the exhaust gas stream 109 is the balance, excluding the first hydrogen stream 111, of the gas stream 107. For example, the exhaust gas stream 109 may include a relatively small portion of the hydrogen from the gas stream 107 in comparison to the first hydrogen stream 111. In some implementations, at least a portion of the exhaust gas stream 109 is recycled back to the pyrolysis chamber 110, as the exhaust gas stream 109 may include unconverted hydrocarbons from the hydrocarbon feed stream 101. In some implementations, at least a portion of the first hydrogen stream 111 is stored and/or transported for use in another industrial process, such as ammonia production, power generation, feedstock for hydrogen fuel cells, hydrocarbon sweetening processes, petroleum refining, metal treating (for example, steel production), fertilizer production, and food processing.

The carbon separation unit 130 is configured to receive the solids stream 105 from the pyrolysis chamber 110. The carbon separation unit 130 is configured to separate the carbon from the solids stream 105 to produce a carbon stream 113. For example, in cases where the solids stream 105 includes liquid(s), the carbon separation unit 130 separates the carbon from the liquid(s) to produce the carbon stream 113. The carbon stream 113 can include carbon black and char. In some implementations, at least a portion of the carbon stream 113 is stored and/or transported for use in another industrial process. In some implementations, at least a portion of the carbon stream 113 is sold to an external market. In some implementations, the system 100 includes a carbon treatment unit 170C. The carbon treatment unit 170C can be configured to receive and process the first solids stream 171$c$ from the hydrocarbon processing unit 170A and/or the carbon stream 113 from the carbon separation unit 130. In some implementations, the carbon treatment unit 170C is configured to reduce (for example, grind, mill and/or crush) the first solids stream 171$c$ and/or the carbon stream 113, such that an average particle size is in a range of from about 100 micrometers to about 500 micrometers. In some implementations, the carbon treatment unit 170C is configured to reduce the first solids stream 171$c$ and/or the carbon stream 113, such that an average particle size is in a range that meets equipment technical specifications. The first solid stream 171$c$ can be combined, stored, and/or sold with at least a portion of the carbon stream 113 separated by the carbon separation unit 130. In some implementations, both the first solids stream 171$c$ and at least a portion of the carbon stream 113 are processed by the carbon treatment unit 170C and stored and/or sold.

Figure 2:
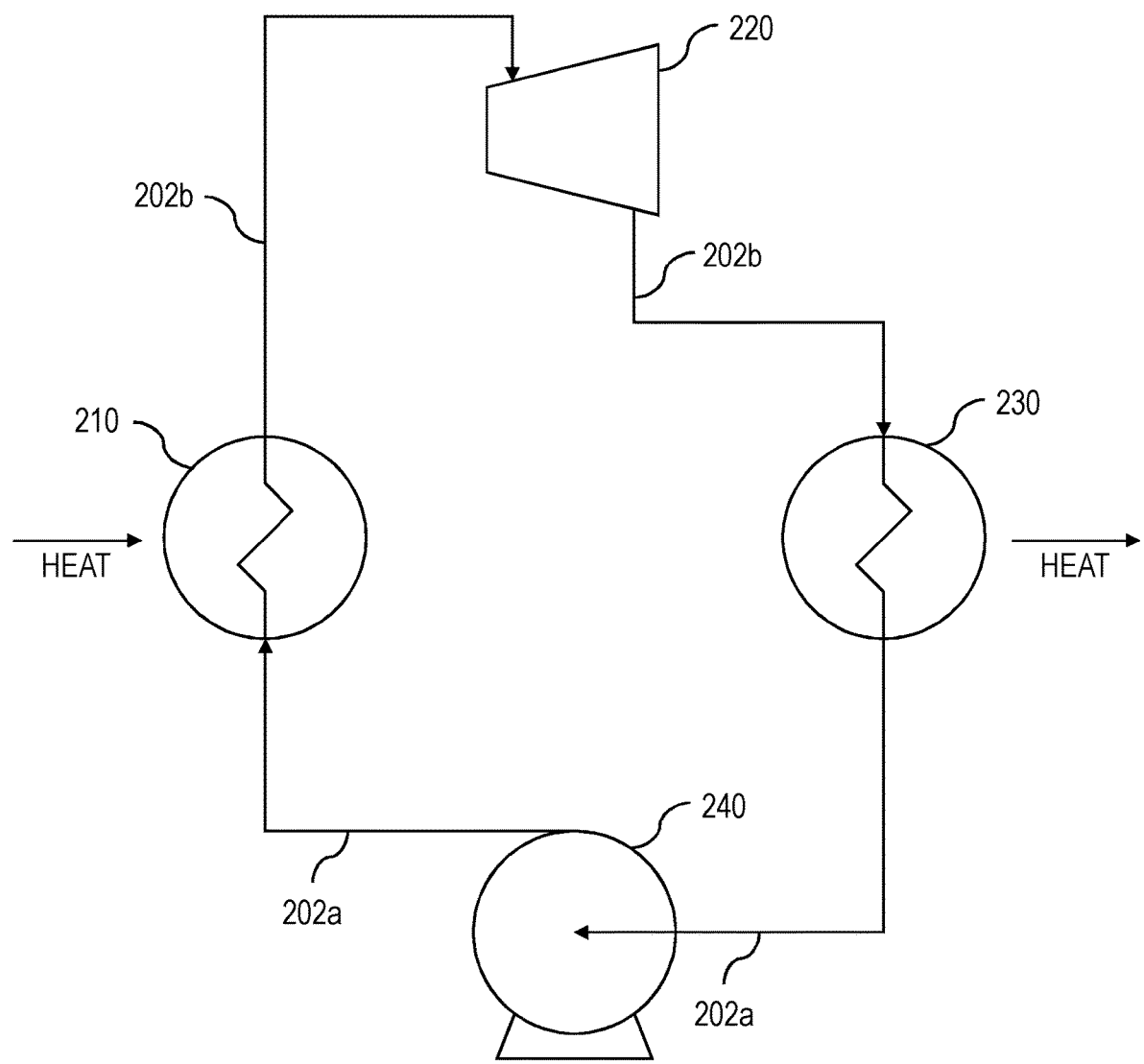
FIG. 2 is a schematic diagram of an example Rankine cycle for using heat to generate power.

The electrolysis unit 140 is configured to receive the water stream 103 and electrical power. The electrolysis unit 140 is configured to use the received electrical power to perform electrolysis on the water stream 103 to produce an oxygen stream 115 and a second hydrogen stream 117. The oxygen stream 115 includes oxygen. At least a portion of the oxygen stream 115 (for example, all of the oxygen stream 115) is flowed to the power generation unit 150 to produce power. In some implementations, at least a portion of the oxygen stream 115 is stored and/or transported for use in another industrial process, such as fuel combustion, power generation, or another industrial process located, for example, off-site where oxygen may be utilized. The second hydrogen stream 117 includes hydrogen. In some implementations, at least a portion of the second hydrogen stream 117 is stored and/or transported for use in another industrial process, such as ammonia production, power generation, feedstock for hydrogen fuel cells, hydrocarbon sweetening processes, petroleum refining, metal treating (for example, steel production), fertilizer production, and food processing. In some implementations, at least a portion of the first hydrogen stream 111 and at least a portion of the second hydrogen stream 117 are combined, stored, and/or transported for use in another industrial process, such as ammonia production, power generation, feedstock for hydrogen fuel cells, hydrocarbon sweetening processes, petroleum refining, metal treating (for example, steel production), fertilizer production, and food processing. The electrolysis unit 140 can be configured to receive electrical power from various sources. For example, the electrolysis unit 140 can be configured to receive electrical power from a renewable energy source. For example, the electrolysis unit 140 can be configured to receive electrical power from a power grid. For example, the electrolysis unit 140 can be configured to receive electrical power from the power generation unit 150. For example, the electrolysis unit 140 can be configured to receive electrical power from a Rankine cycle (an example is shown in FIG. 2 and is described in more detail later). The electrolysis unit 140 can be configured to switch amongst sources of electrical power based on available power from the various sources and power demand.

The power generation unit 150 is configured to receive at least a portion of the oxygen stream 115 (for example, a majority of or all of the oxygen stream 115) from the electrolysis unit 140 and at least a portion of the carbon stream 113 and/or at least a portion of the first solids stream 171$c$. In some implementations, the power generation unit 150 includes a direct carbon fuel cell 151. The direct carbon fuel cell 151 is configured to combine the oxygen from the portion (or all) of the oxygen stream 115 and the carbon from the portion (or all) of the carbon stream 113 to generate power and a carbon dioxide stream 119. The carbon dioxide stream 119 includes carbon dioxide. The carbon dioxide stream 119 generated by the direct carbon fuel cell 151 is a high-purity carbon dioxide stream. For example, the carbon dioxide stream 119 includes at least 99 volume percent (vol. %) or at least 99.9 vol. % of carbon dioxide. For example, the carbon dioxide stream 119 is pure carbon dioxide. The power generated by the power generation unit 150 can be distributed, for example, by the power distribution unit 160, which is described in more detail later. At least a portion of the power generated by the power generation unit 150 is provided to the electrolysis unit 140 to perform electrolysis on the water stream 103.

The power generation unit 150 can include additional and/or alternative components apart from the direct carbon fuel cell 151 for generating power. In some implementations, the power generation unit 150 includes a combustion chamber (not shown) in which the carbon (fuel) from the portion (or all) of the carbon stream 113 and/or the portion (or all) of the first solids stream 171$c$ is combusted in the presence of the oxygen (oxidant) from the portion (or all) of the oxygen stream 115. In such implementations, heat is generated when the carbon is oxidized. The heat from the combustion can be used in a Rankine cycle (for example, including a turbine) to generate power (an example is shown in FIG. 2 and is described in more detail later). For example, the heat from the combustion can be used by a boiler to generate steam for use in a steam turbine to generate electricity. Waste heat can, for example, be recovered and be used to heat other process streams in the system (for example, the hydrocarbon feed stream 101) and/or for generating electricity, for example, by a Rankine cycle.

The dry reforming unit 170B is configured to receive at least a portion of the carbon dioxide stream 119 produced by the power generation unit 150. In some implementations, the dry reforming unit 170B is configured to receive at least a portion of the first gas stream 171$b$ from the hydrocarbon processing unit 170A. The dry reforming unit 170B is configured to contact the portion of the carbon dioxide stream 119 and the portion of the first gas stream 171$b$ with a dry reforming catalyst under dry reforming conditions to form a syngas stream 173. The syngas stream 173 includes carbon monoxide and hydrogen. The dry reforming unit 170B includes a reactor and the dry reforming catalyst disposed within the reactor. The dry reforming catalyst can include a noble metal catalyst, such as a nickel- (or nickel alloy-) based catalyst. In some implementations, the dry reforming catalyst includes nickel, perovskite, hydrotalcite, pyrochlore, platinum, palladium, ruthenium, rhodium, iridium, or any combination of these. The dry reforming conditions can include a dry reforming temperature that is in a range of from about 400° C. to about 1,000° C. or from about 700° C. to about 950° C. The dry reforming unit 170B can include a heater to provide the necessary heat/energy for dry reforming. The heater can be, for example, a gas-based burner or an electrical heater including an electrical resistor. In cases in which the heater includes an electrical resister (electric heater), power can be supplied to the heater to generate heat in the dry reforming unit 170B. In some implementations, at least a portion of the power generated by the power generation unit 150 is provided to the dry reforming unit 170B (for example, to the electric heater) to generate heat in the dry reforming unit 170B to maintain the dry reforming temperature and produce the syngas stream 173.

In some implementations, the dry reforming unit 170B is configured to separate at least a portion of the carbon monoxide from the syngas stream 173. The carbon monoxide separated from the syngas stream 173 can be used, for example, as feedstock for producing different chemicals, such as methanol, acetic acid, dimethyl ether, or biofuels. In some implementations, the dry reforming unit 170B is configured to oxidize at least a portion of the carbon monoxide separated from the syngas stream 173 to produce carbon dioxide. In some implementations, the carbon dioxide (from oxidation of the carbon monoxide separated from the syngas stream 173) is transported (for example, via a pipeline) and sequestered, for example, in a subterranean zone in the Earth. The subterranean zone can be a formation within the Earth defining a reservoir, but in other instances, the zone can be multiple formations or a portion of a formation. The subterranean zone can include, for example, a formation, a portion of a formation, or multiple formations in a reservoir. In some implementations, the subterranean zone includes an underground formation of naturally fractured or porous rock. In some implementations, the zone can intersect other types of formations, including reservoirs that are not naturally fractured. In some implementations, the carbon dioxide (from oxidation of the carbon monoxide separated from the syngas stream 173) is stored and/or transported for use in another industrial process, such as cement production. In some implementations, the carbon dioxide (from oxidation of the carbon monoxide separated from the syngas stream 173) is injected into a subterranean formation, for example, to enhance recovery of hydrocarbons from the subterranean formation. The carbon dioxide is not released to the atmosphere and therefore does not contribute to greenhouse gas emissions.

In some implementations, a portion of the carbon dioxide stream 119 is transported (for example, via a pipeline) and used in industrial application(s) and/or sequestered, for example, in a subterranean zone in the Earth. In some implementations, a portion of the carbon dioxide stream 119 is stored and/or transported for use in another industrial process, such as cement production. In some implementations, a portion of the carbon dioxide stream 119 is injected into a subterranean formation, for example, to enhance recovery of hydrocarbons from the subterranean formation. The carbon dioxide stream 119 is not released to the atmosphere and therefore does not contribute to greenhouse gas emissions.

In some implementations, the system 100 includes a power distribution unit 160. The power distribution unit 160 can receive power from various sources. For example, the power distribution unit 160 can be connected to and receive power from a power grid. For example, the power distribution unit 160 can be connected to and receive power from a renewable energy source (such as wind or solar energy). For example, the power distribution unit 160 can be connected to and receive power from the power generation unit 150. For example, the power distribution unit 160 can be connected to and receive power from a Rankine cycle (for example, from a turbine in the Rankine cycle). The power distribution unit 160 can distribute power to various users. For example, the power distribution unit 160 can be connected to and deliver power to the electrolysis unit 140. For example, the power distribution unit 160 can be connected to and deliver power to the pyrolysis chamber 110. For example, the power distribution unit 160 can be connected to and deliver power to a power grid. For example, the power distribution unit 160 can be connected to and deliver power to a Rankine cycle (for example, to a pump in the Rankine cycle).

In some implementations, at least a portion of the power generated by the power generation unit 150 is used by another component of the system 100. For example, at least a portion of the power generated by the power generation unit 150 can be provided to the electrolysis unit 140 to perform electrolysis on the water stream 103. For example, at least a portion of the power generated by the power generation unit 150 can be used to provide heat to the pyrolysis chamber 110 to perform pyrolysis on the hydrocarbon feed stream 101. For example, at least a portion of the power generated by the power generation unit 150 can be used to process the crude oil stream in the hydrocarbon processing unit 170A. For example, at least a portion of the power generated by the power generation unit 150 can be used to perform the dry reforming in the dry reforming unit 170B. In some implementations, at least a portion of the power generated by the power generation unit 150 is provided to another user. For example, at least a portion of the power generated by the power generation unit 150 can be used in another industrial process. For example, at least a portion of the power generated by the power generation unit 150 can be delivered to a power grid, where it can be stored and/or distributed to various users offsite.

Figure 1B:
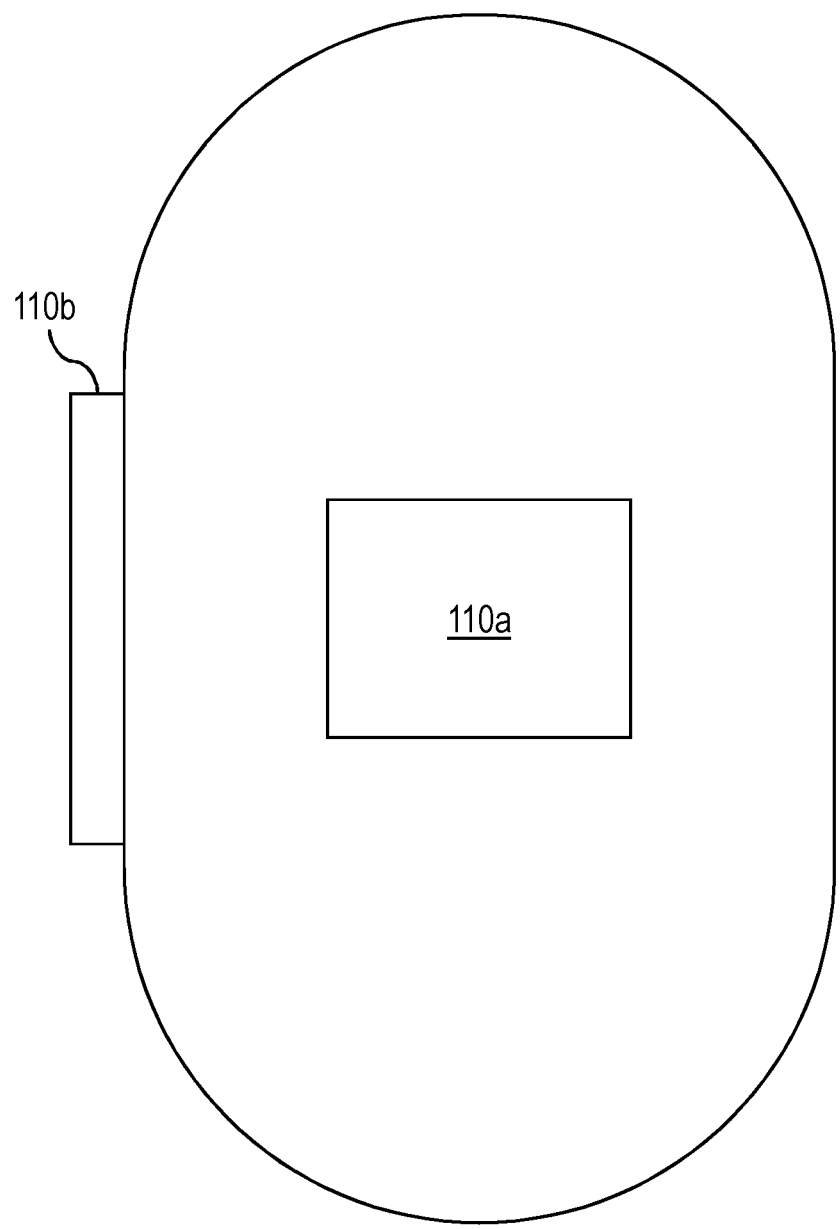
FIG. 1B is a schematic diagram of an example pyrolysis chamber that can be implemented in the system of FIG. 1A.

FIG. 1B is a schematic diagram of an example of the pyrolysis chamber 110. In some implementations, as shown in FIG. 1B, the pyrolysis chamber 110 includes a catalyst 110a. The catalyst 110a can include at least one of activated carbon, carbon black, cobalt, iron, copper, nickel, or other oxides/rare earth metals, such as lanthanum oxide or cerium oxide. The operating pressure within the pyrolysis chamber 110 can be substantially atmospheric pressure (about 1 atmosphere). The pyrolysis chamber 110 includes a heater 110b. In cases in which the pyrolysis chamber 110 is a plasma pyrolysis reactor, the heater 110b includes electrodes, and the pyrolysis chamber 110 is supplied with an inert gas along with the hydrocarbon feed stream 101. Power can be supplied to the electrodes of the heater 110b, and the inert gas serves as the working gas to produce plasma to pyrolyze the hydrocarbon feed stream 101. In cases in which the pyrolysis chamber 110 is a catalytic or non-catalytic reactor, the heater 110b provides indirect heat by a mechanism that generates radiant heat. For example, the heater 110b can be a gas-based burner or an electrical heater including an electrical resistor. In cases in which the heater 110b includes electrodes (plasma reactor) or an electrical resistor (electric heater), power is supplied to the heater 110b to generate heat in the pyrolysis chamber 110.

Figure 1C:
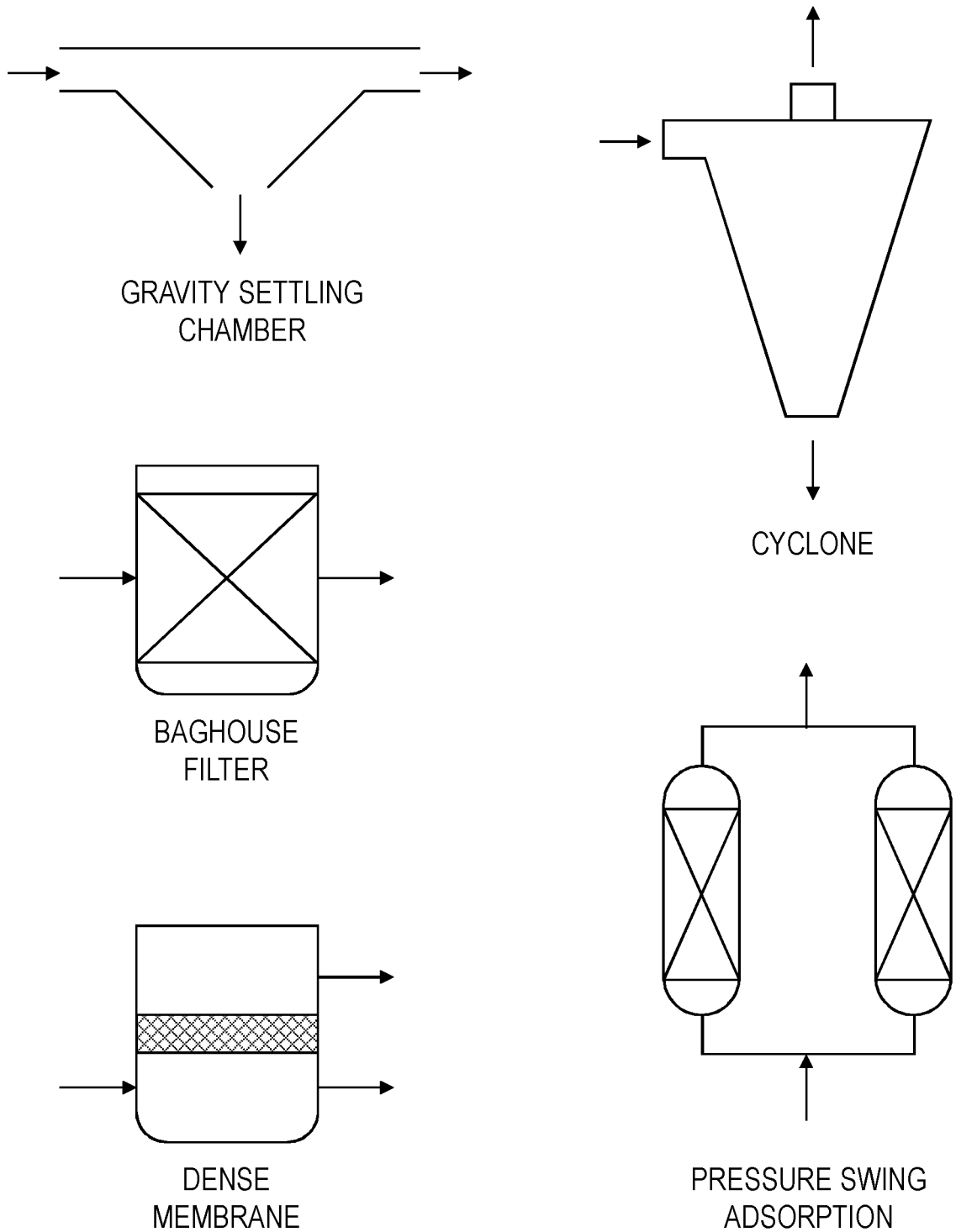
FIG. 1C is a schematic diagram of examples of components that can be included in the gas separation unit of the system of FIG. 1A.

FIG. 1C is a schematic diagram of examples of components that can be included in the gas separation unit 120. The gas separation unit 120 can include a gravity settling chamber, a cyclone, a baghouse filter, a microfilter, a pressure swing adsorption bed, a temperature swing adsorption bed, a dense membrane, or any combination of these. As mentioned previously, the gas separation unit 120 separates the gas stream 107 into the exhaust gas stream 109 and the first hydrogen stream 111. The first hydrogen stream 111 includes at least a majority of the hydrogen from the gas stream 107, and the exhaust gas stream 109 includes a balance of the gas stream 107. As such, the gas separation unit 120 is primarily used to extract the hydrogen from the gas stream 107. Pressure swing adsorption bed(s), temperature swing adsorption bed(s), dense membrane(s), or any combination of these can be used to extract the hydrogen from the gas stream 107. In some cases, the gas stream 107 may include some solid particulates (for example, particulates of solid carbon entrained in the gas stream 107). In such cases, gravity settling chamber(s), cyclone(s), baghouse filter(s), microfilter(s), or any combination of these can be used to remove the solids from the gas stream 107. The components included in the gas separation unit 120 are configured to operate at an expected operating range (operating pressure and temperature ranges) of the gas stream 107 plus a design margin (for example, ±5%, ±10%, ±15%, ±20%, ±25%, or ±30%). In some implementations, the gas stream 107 is cooled prior to entering the gas separation unit 120.

FIG. 1C depicts examples of a gravity settling chamber, a cyclone, a baghouse filter, a pair of pressure swing adsorption bed, and a dense membrane. In gravity settling chamber(s) and/or cyclone(s), an exit velocity of the gas stream 107 can be less than 300 centimeters per second (cm/s). For example, the exit velocity of the gas stream 107 exiting a gravity settling chamber can be about 275 cm/s, about 250 cm/s, about 225 cm/s, about 200 cm/s, about 175 cm/s, about 150 cm/s, about 125 cm/s, about 100 cm/s, about 90 cm/s, about 80 cm/s, about 70 cm/s, about 60 cm/s, about 50 cm/s, about 40 cm/s, about 30 cm/s, about 20 cm/s, about 10 cm/s or about 5 cm/s. In some implementations, it is preferable for the exit velocity of the gas stream 107 exiting a gravity settling chamber to be less than 30 cm/s. In some implementations, the gravity settling chamber and/or the cyclone is configured to remove solid particulates having an average or maximum particle size in a range of from about 10 microns to about 50 microns from the gas stream 107. The density of the solid particulates may also be a factor in the separation of solid particulates from the gas stream 107. In pressure swing adsorption beds, the extraction of hydrogen from the gas stream 107 depends on various factors, such as pressure differential between the beds and adsorbent material. As shown in FIG. 1C, for pressure swing adsorption beds, there are at least two vessels which swing across a range of pressures. During an adsorption process, fluid (for example, the gas stream 107) flows through the beds in a first direction, and hydrogen is adsorbed to the bed(s) to produce the exhaust gas stream 109. During a desorption process, fluid flows through the beds in a second direction, and hydrogen is desorbed from the bed(s) to produce the first hydrogen stream 111.

Figure 1D:
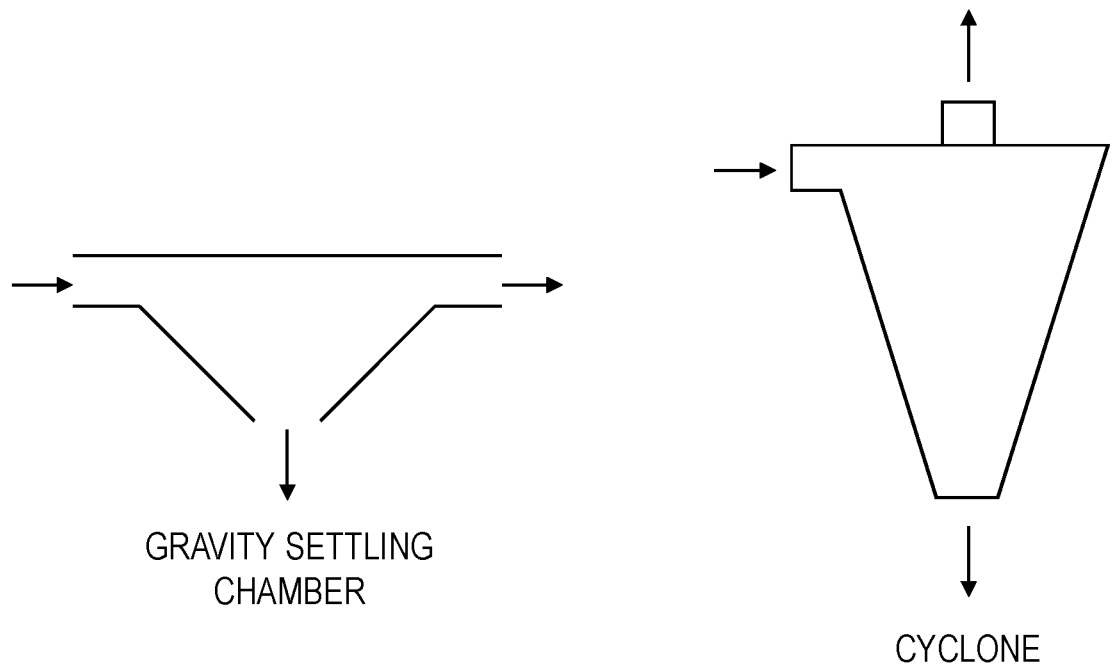
FIG. 1D is a schematic diagram of examples of components that can be included in the carbon separation unit of the system of FIG. 1A.
Figure 1D:
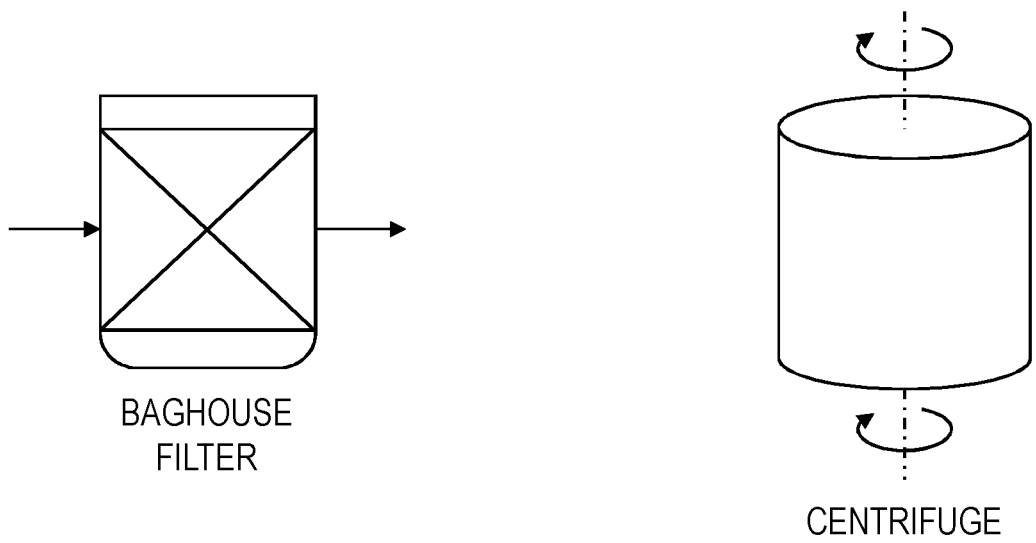

FIG. 1D is a schematic diagram of examples of components that can be included in the carbon separation unit 130. The carbon separation unit 130 can include a gravity settling chamber, a cyclone, a baghouse filter, a microfilter, a centrifuge, a wet collector, electrostatic separation, acid flux treatment, or any combination of these. As mentioned previously, the carbon separation unit 130 separates the carbon from the solids stream 105 to produce the carbon stream 113. As such, the carbon separation unit 130 is primarily used to extract the carbon from the solids stream 105. The components included in the carbon separation unit 130 are configured to operate at an expected operating range (operating pressure and temperature ranges) of the solids stream 105 plus a design margin (for example, ±5%, ±10%, ±15%, ±20%, ±25%, or ±30%).

FIG. 1D depicts examples of a gravity settling chamber, a cyclone, a baghouse filter, and a centrifuge. In gravity settling chamber(s) and/or cyclone(s), an exit velocity of the solids stream 105 can be less than 300 centimeters per second (cm/s). For example, the exit velocity of the solids stream 105 exiting a gravity settling chamber can be about 275 cm/s, about 250 cm/s, about 225 cm/s, about 200 cm/s, about 175 cm/s, about 150 cm/s, about 125 cm/s, about 100 cm/s, about 90 cm/s, about 80 cm/s, about 70 cm/s, about 60 cm/s, about 50 cm/s, about 40 cm/s, about 30 cm/s, about 20 cm/s, about 10 cm/s or about 5 cm/s. In some implementations, it is preferable for the exit velocity of the solids stream 105 exiting a gravity settling chamber to be less than 30 cm/s. In some implementations, the gravity settling chamber and/or the cyclone is configured to remove solid particulates having an average or maximum particle size in a range of from about 10 microns to about 50 microns from the solids stream 105. Smaller particle sizes may be desired for sale to external markets, as carbon particles of smaller sizes can have greater commercial value in comparison to carbon particles of larger sizes. In such cases, the carbon particles of larger sizes may be used, for example, in power generation. The density of the solid particulates may also be a factor in the separation of solid particulates from the solids stream 105. In centrifuge(s), the rotation speed can depend on the desired size of the carbon particulates to be removed from the solids stream 105. For example, the rotation speeds of the centrifuge(s) can be in a range of from about 1,500 revolutions per minute (rpm) to about 50,000 rpm. In some cases, the rotation speeds of the centrifuge(s) can be greater than 50,000 rpm.

Figure 1E:
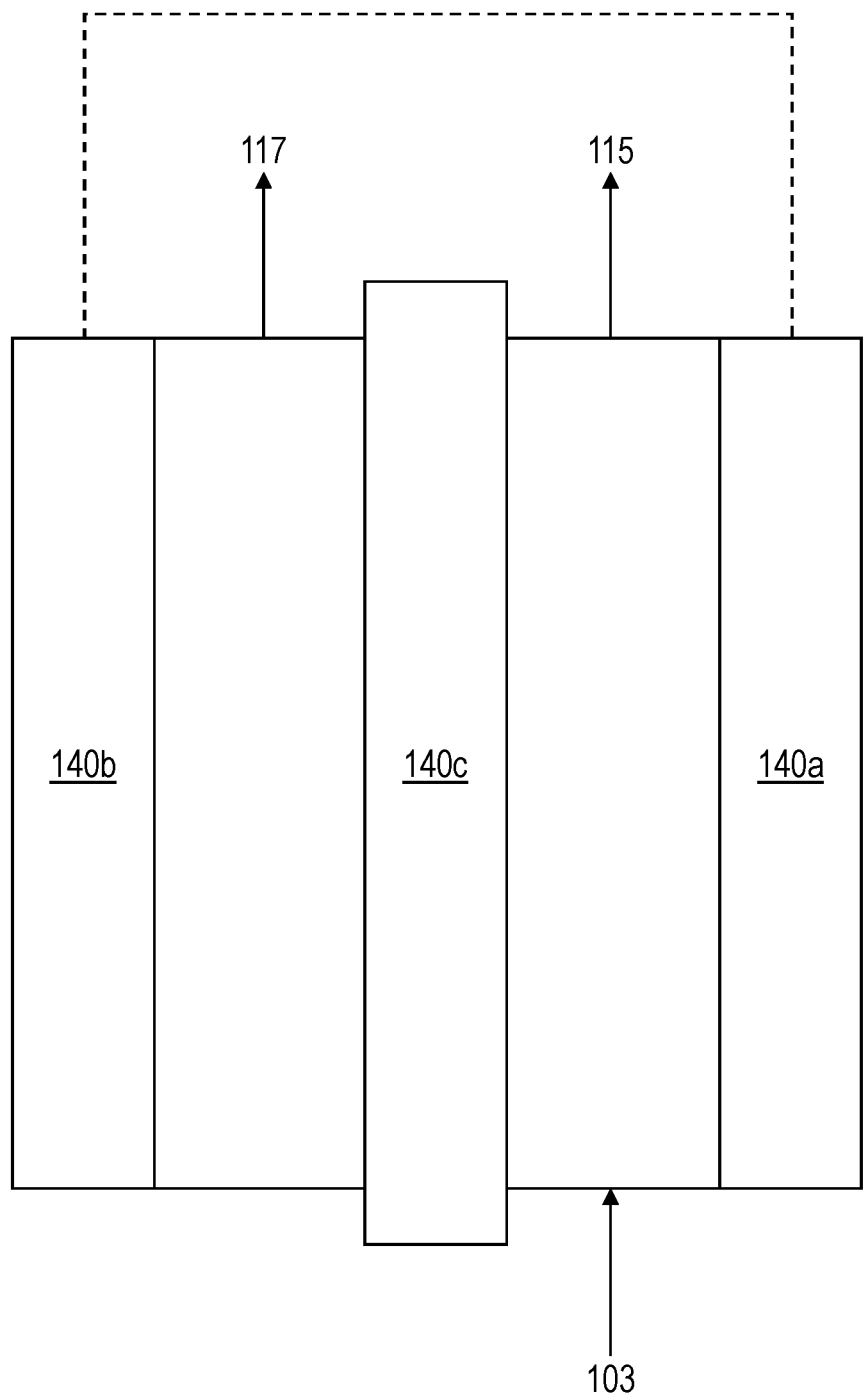
FIG. 1E is a schematic diagram of an example electrolysis unit that can be implemented in the system of FIG. 1A.

FIG. 1E is a schematic diagram of an example of the electrolysis unit 140. The example electrolysis unit 140 shown in FIG. 1E is a polymer electrolyte membrane (PEM) electrolysis unit, but different types of electrolysis units, such as an alkaline water electrolysis unit, a solid oxide electrolysis unit, or an anion exchange membrane (AEM) electrolysis unit, may alternatively or additionally be used. The PEM electrolysis unit 140 includes an anode 140a, a cathode 140b, and a proton-exchange membrane 140c. The proton-exchange membrane 140c is a solid polymer electrolyte membrane that conducts protons from the anode 140a to the cathode 140b while insulating the electrodes (140a, 140b) electrically. The half reaction taking place on the side of the anode 140a is also referred to as the oxygen evolution reaction (Equation 1).

$$2H_2O \rightarrow O_2 + 4H^+ + 4e^- \quad (1)$$

The half reaction taking place on the side of the cathode 140b is also referred to as the hydrogen evolution reaction (Equation 2).

$$4H^+ + 4e^- \rightarrow 2H_2 \quad (2)$$

The water stream 103 enters the PEM electrolysis unit 140. The PEM electrolysis unit 140 splits the water into hydrogen and oxygen. The generated hydrogen and oxygen are separated from each other. For example, the membrane may be permeable to hydrogen, such that the hydrogen is allowed to pass through the membrane to separate from the oxygen, while the oxygen remains on the opposite side of the membrane. The oxygen stream 115 exits the PEM electrolysis unit 140 from the side of the anode 140a, and the second hydrogen stream 117 exits the PEM electrolysis unit 140 from the side of the cathode 140b.

The open circuit voltage of the operating electrolysis unit 140 can be in a range of from about 1.2 volts (V) to about 2.5 V. In some implementations, the operating temperature of the PEM electrolysis unit 140 is in a range of from about 50 degrees Celsius (° C.) to about 80° C. In some implementations, the operating pressure of the PEM electrolysis unit 140 is less than about 70 bar. In some implementations, the electric current density of the power provided to the PEM electrolysis unit 140 is in a range of from about 1 ampere per square centimeter (A/cm$^2$) to about 6 A/cm$^2$.

In cases in which the electrolysis unit 140 is an alkaline water electrolysis unit, the open circuit voltage of the operating electrolysis unit 140 can be in a range of from about 1.2 V to about 3 V. In some implementations, the operating temperature of the alkaline water electrolysis unit 140 is in a range of from about 70° C. to about 90° C. In some implementations, the operating pressure of the alkaline water electrolysis unit 140 is less than about 70 bar. In some implementations, the electric current density of the power provided to the alkaline water electrolysis unit 140 is in a range of from about 0.2 A/cm$^2$ to about 6 A/cm$^2$.

In cases in which the electrolysis unit 140 is a solid oxide electrolysis unit, the open circuit voltage of the operating electrolysis unit 140 can be in a range of from about 1 V to about 1.5 V. In some implementations, the operating temperature of the solid oxide electrolysis unit 140 is in a range of from about 550° C. to about 900° C., from about 700° C. to about 850° C., or from about 750° C. to about 800° C. In some implementations, the operating pressure of the solid oxide electrolysis unit 140 is less than about 30 bar. In some implementations, the electric current density of the power provided to the solid oxide electrolysis unit 140 is in a range of from about 0.3 A/cm$^2$ to about 6 A/cm$^2$.

In cases in which the electrolysis unit 140 is an AEM electrolysis unit, the open circuit voltage of the operating electrolysis unit 140 can be in a range of from about 1.2 V to about 2 V. In some implementations, the operating temperature of the AEM electrolysis unit 140 is in a range of from about 40° C. to about 80° C. In some implementations, the operating pressure of the AEM electrolysis unit 140 is less than about 70 bar. In some implementations, the electric current density of the power provided to the AEM electrolysis unit 140 is in a range of from about 0.2 A/cm$^2$ to about 6 A/cm$^2$.

Figure 1F:
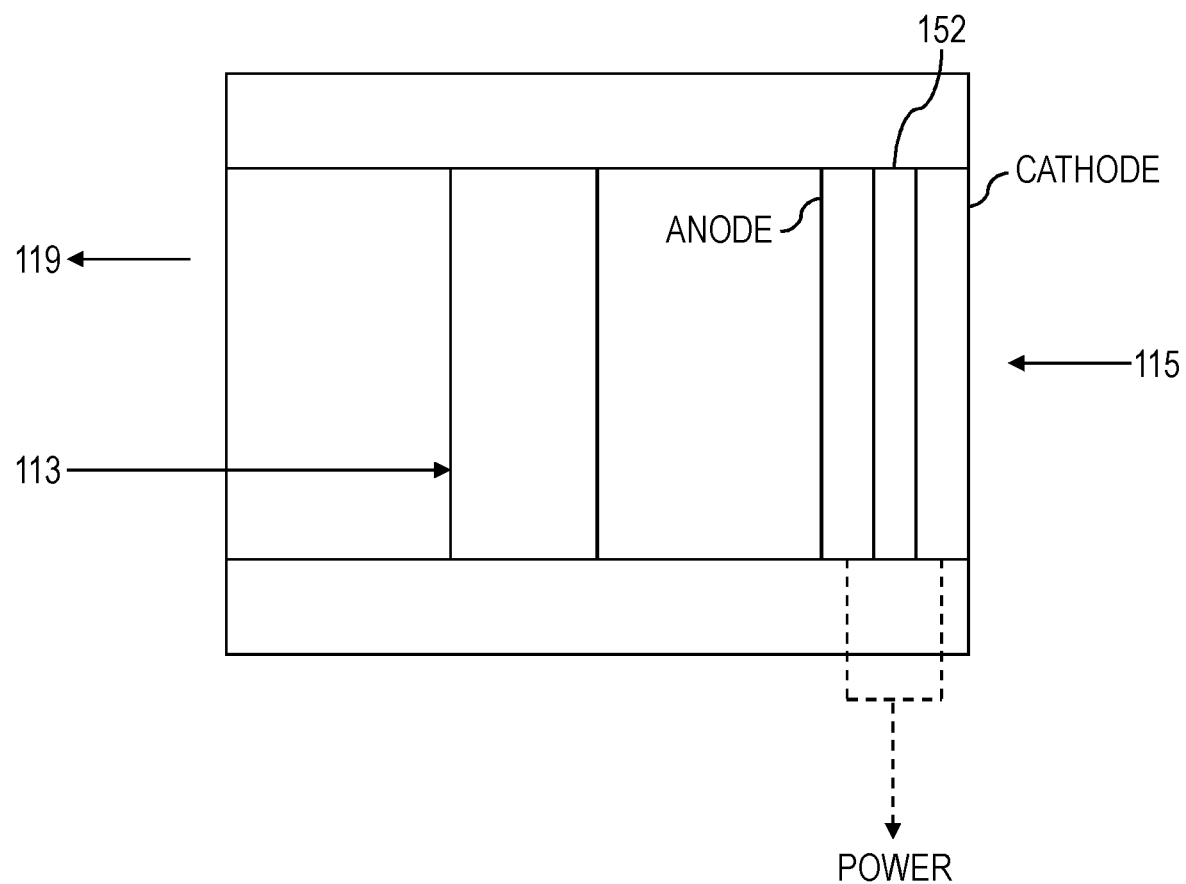
FIG. 1F is a schematic diagram of an example direct carbon fuel cell (DCFC) that can be implemented in the system of FIG. 1A.

FIG. 1F is a schematic diagram of an example of the direct carbon fuel cell 151. The example direct carbon fuel cell 151 shown in FIG. 1F includes a solid oxide electrolyte 152, but different types of electrolytes, such as a molten salt (for example, hydroxide salt), molten carbonate, or molten tin anode, may alternatively or additionally be used. Oxygen from the oxygen stream 115 flows to the direct carbon fuel cell 151, and carbon from the carbon stream 113 flows to the direct carbon fuel cell 151. The direct carbon fuel cell 151 combines the oxygen and the carbon to produce carbon dioxide and electrical power. The carbon dioxide stream 119 flows out of the direct carbon fuel cell 151. In some implementations, the solid oxide electrolyte 152 is zirconium oxide ($ZrO_2$). In some implementations, the solid oxide electrolyte 152 is doped with an oxide, such as yttrium oxide ($Y_2O_3$) or scandium(III) oxide ($Sc_2O_3$). The solid oxide electrolyte 152 can be configured to combine carbon and oxygen at an operating temperature in a range of from about 550° C. to about 1,000° C., from about 600° C. to about 1,000° C., from about 650° C. to about 1,000° C., from about 700° C. to about 1,000° C., from about 750° C. to about 1,000° C., from about 800° C. to about 1000° C., from about 850° C. to about 1,000° C., from about 900° C. to about 1,000° C., or from about 950° C. to about 1,000° C. to generate electrical power and carbon dioxide.

In cases in which the direct carbon fuel cell 151 includes a molten salt electrolyte (for example, potassium hydroxide or sodium hydroxide), the direct carbon fuel cell 151 can be configured to combine carbon and oxygen at an operating temperature in a range of from about 500° C. to about 600° C. to generate power and carbon dioxide. In cases in which the direct carbon fuel cell 151 includes a molten carbonate electrolyte (for example, including lithium, sodium, or potassium), the direct carbon fuel cell 151 can be configured to combine carbon and oxygen at an operating temperature in a range of from about 600° C. to about 900° C. to generate power and carbon dioxide. In cases in which the direct carbon fuel cell 151 includes a molten tin anode, the direct carbon fuel cell 151 can be configured to combine carbon and oxygen at an operating temperature of about 900° C. to generate power and carbon dioxide.

Figure 1G:
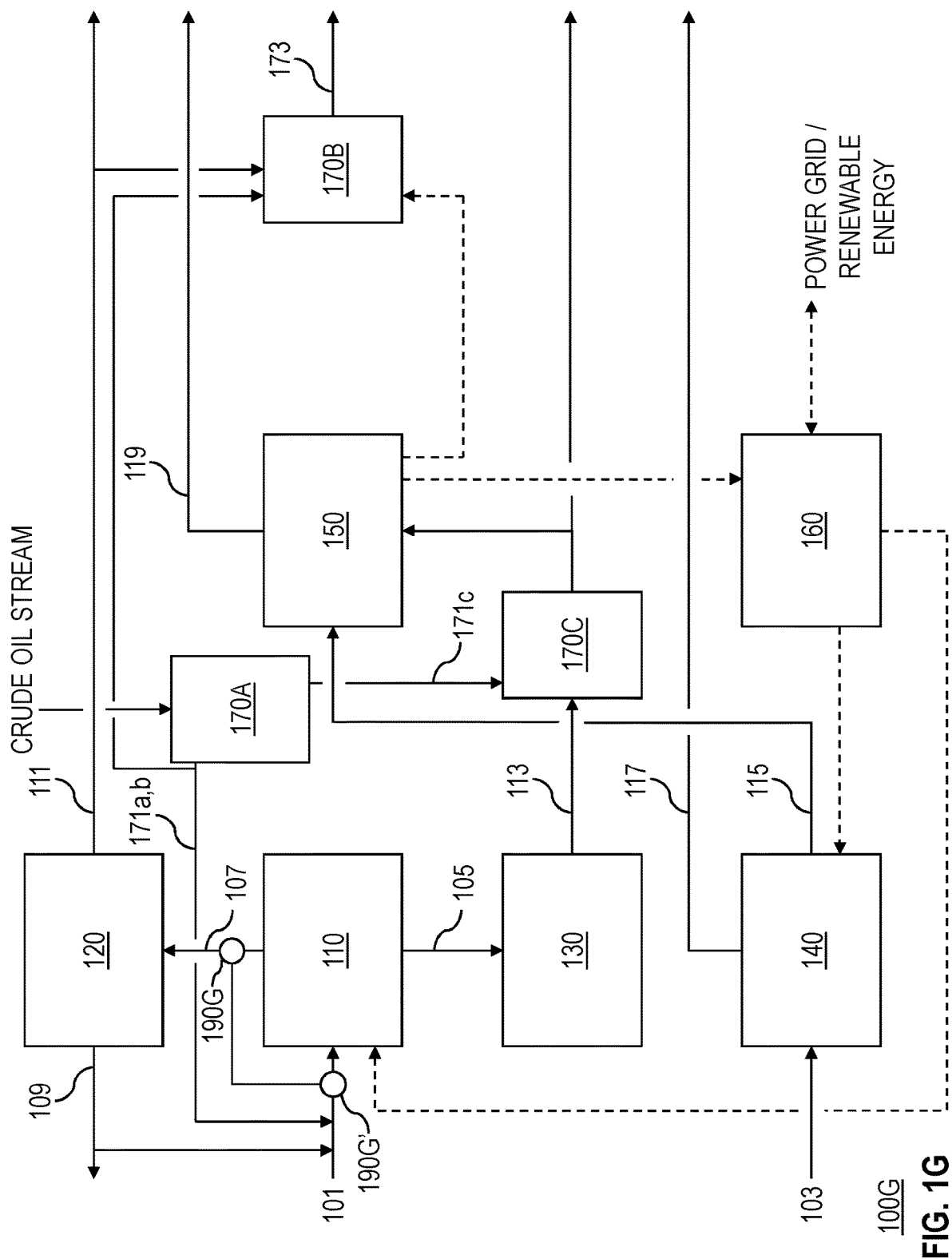
FIG. 1G is a schematic diagram of an example system for co-production of hydrogen, carbon, electricity, and carbon monoxide that implements waste heat recovery.

FIG. 1G is a schematic diagram of an example system 100G for co-production of hydrogen, carbon, and electricity that implements waste heat recovery. The system 100G can be substantially similar to and include substantially the same components as the system 100A shown in FIG. 1A. The system 100G includes a first waste heat recovery heat exchanger 190G and a second waste heat recovery heat exchanger 190G'. The first waste heat recovery heat exchanger 190G is in fluid communication, on a first side, with at least a portion of the gas stream 107 exiting the pyrolysis chamber 110. The first waste heat recovery heat exchanger 190G is in fluid communication, on a second side, with a buffer fluid. The first waste heat recovery heat exchanger 190G is configured to transfer heat from the portion (or all) of the gas stream 107 to the buffer fluid. Thus, the gas stream 107 is cooled by the first waste heat recovery heat exchanger 190G prior to being processed by the gas separation unit 120. The second waste heat recovery heat exchanger 190G' can be in fluid communication, on a first side, with at least a portion of the hydrocarbon feed stream 101 entering the pyrolysis chamber 110. The second waste heat recovery heat exchanger 190G' can be in fluid communication, on a second side, with the buffer fluid. The second waste heat recovery heat exchanger 190G' can be configured to transfer heat from the buffer fluid to the portion (or all) of the hydrocarbon feed stream 101 prior to the hydrocarbon feed stream 101 entering the pyrolysis chamber 110. Thus, the first and second waste heat recovery heat exchangers 190G, 190G' cooperate to recover heat from the gas stream 107 and use the recovered heat to pre-heat the portion (or all) of the hydrocarbon feed stream 101 before the hydrocarbon feed stream 101 is pyrolyzed in the pyrolysis chamber 110. The buffer fluid is an intermediary fluid that transfers the heat from the gas stream 107 to the hydrocarbon feed stream 101. The buffer fluid can be any suitable fluid that can transfer heat from the gas stream 107 to the hydrocarbon feed stream 101. For example, the buffer fluid can be an aqueous fluid or an oil-based fluid (such as a hydrocarbon fluid). For example, the buffer fluid can include supercritical carbon dioxide.

Figure 1H:
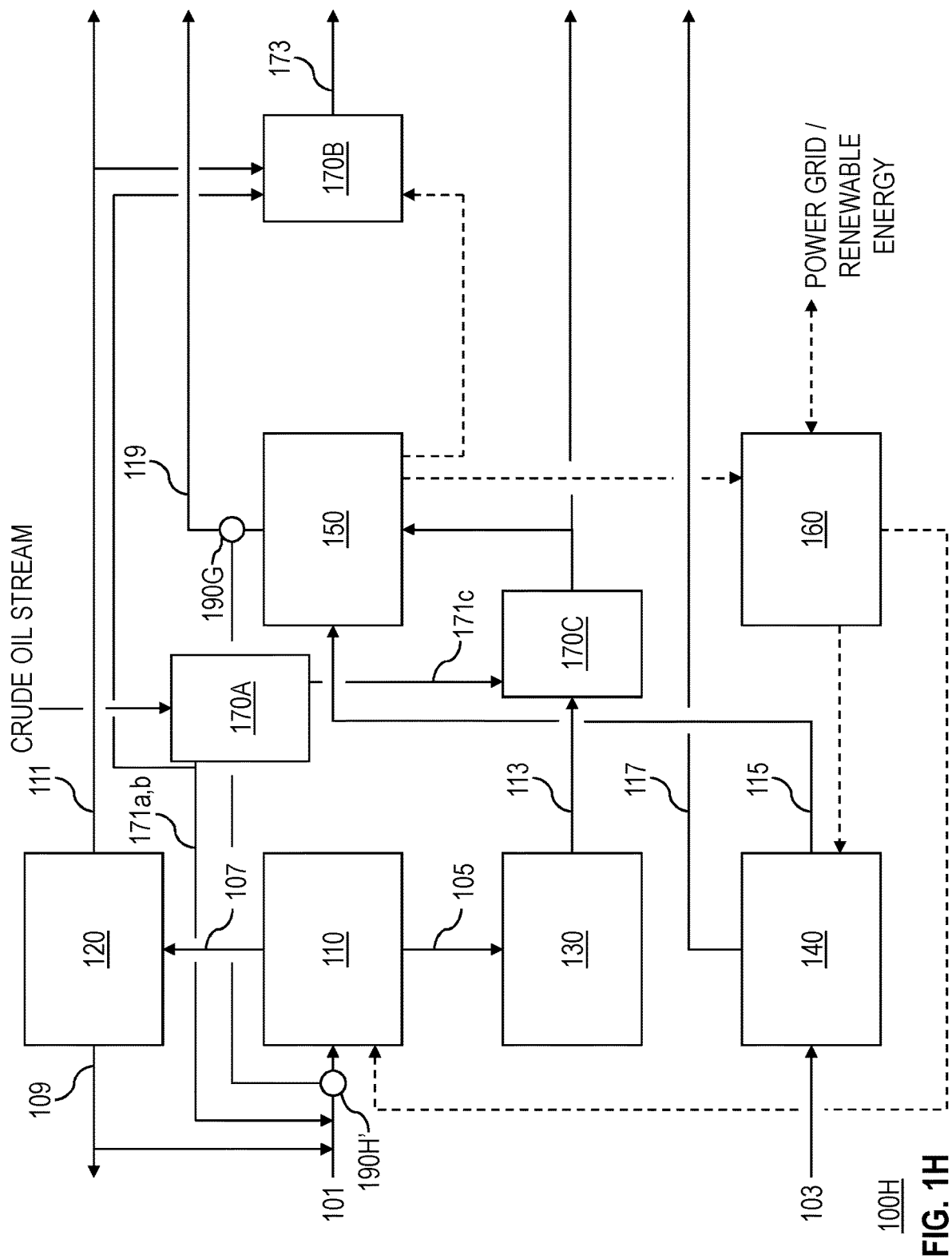
FIG. 1H is a schematic diagram of an example system for co-production of hydrogen, carbon, electricity, and carbon monoxide that implements waste heat recovery.

FIG. 1H is a schematic diagram of an example system 100H for co-production of hydrogen, carbon, and electricity that implements waste heat recovery. The system 100H can be substantially similar to and include substantially the same components as the system 100A shown in FIG. 1A. The system 100H includes a first waste heat recovery heat exchanger 190H and a second waste heat recovery heat exchanger 190H'. The first waste heat recovery heat exchanger 190H is in fluid communication, on a first side, with at least a portion of the carbon dioxide stream 119 exiting the power generation unit 150. The first waste heat recovery heat exchanger 190H is in fluid communication, on a second side, with a buffer fluid. The first waste heat recovery heat exchanger 190H is configured to transfer heat from the portion (or all) of the carbon dioxide stream 119 to the buffer fluid. The second waste heat recovery heat exchanger 190H' can be in fluid communication, on a first side, with at least a portion of the hydrocarbon feed stream 101 entering the pyrolysis chamber 110. The second waste heat recovery heat exchanger 190H' can be in fluid communication, on a second side, with the buffer fluid. The second waste heat recovery heat exchanger 190H' can be configured to transfer heat from the buffer fluid to the portion (or all) of the hydrocarbon feed stream 101 prior to the hydrocarbon feed stream 101 entering the pyrolysis chamber 110. Thus, the first and second waste heat recovery heat exchangers 190H, 190H' cooperate to recover heat from the gas stream 107 and use the recovered heat to pre-heat the portion (or all) of the hydrocarbon feed stream 101 before the hydrocarbon feed stream 101 is pyrolyzed in the pyrolysis chamber 110. The buffer fluid is an intermediary fluid that transfers the heat from the gas stream 107 to the hydrocarbon feed stream 101. The buffer fluid can be any suitable fluid that can transfer heat from the gas stream 107 to the hydrocarbon feed stream 101. For example, the buffer fluid can be an aqueous fluid, an oil-based fluid (such as a hydrocarbon fluid), or a supercritical fluid (such as supercritical carbon dioxide). Although FIGS. 1G and 1H show specific examples in which waste heat can be recovered from specific areas within the respective systems, waste heat recovery can be implemented wherever waste heat is produced.

FIG. 2 is a schematic diagram of an example Rankine cycle 200 for using heat to generate power. The cycle 200 includes a boiler 210, a turbine 220, a condenser 230, and a pump 240. The pump 240 circulates a working fluid 202 through the cycle 200. The working fluid 202 undergoes changes in temperature and pressure as the working fluid 202 flows through the cycle 200. The changes in temperature and pressure cause the working fluid 202 to experience phase changes as the working fluid 202 flows through the cycle 200. For clarity, the various states (with varying phase compositions) of the working fluid 202 are denoted as 202 followed by a letter (for example, 202a and 202b). The overall composition of the working fluid 202 does not change as the working fluid 202 flows through the cycle 200. However, the individual phases (for example, gaseous phase and liquid phase) may have varying compositions based on operating conditions, heat, and work (thermodynamics).

The working fluid 202 in liquid form (202a) enters the boiler 210. The boiler 210 is configured to receive the liquid working fluid 202. The boiler 210 is configured to transfer heat to the working fluid 202 to produce a vaporized working fluid 202b. The vaporized working fluid 202b flows from the boiler 210 to the turbine 220. The turbine 220 is configured to receive the vaporized working fluid 202b. The turbine 220 is configured to generate power as the vaporized working fluid 202b flows and expands through the turbine 220. The vaporized working fluid 202b exiting the turbine 220 has a reduced operating pressure in comparison to the vaporized working fluid 202b entering the turbine 220. The vaporized working fluid 202b flows from the turbine 220 to the condenser 230. The condenser 230 is configured to receive and condense the vaporized working fluid 202b into a condensed working fluid 202a. The condensed working fluid 202a flows from the condenser 230 to the pump 240. The pump 240 is configured to circulate the condensed working fluid 202a back to the boiler 210 to begin the cycle 200 again.

The heat used by the boiler 210 to vaporize the working fluid 202 can be provided by various sources. In some implementations, the boiler 210 receives heat from a buffer fluid (for example, from the first waste heat recovery heat exchanger 190H or 190J). For example, the boiler 210 can be configured to be in fluid communication, on a first side, with the buffer fluid from the first waste heat recovery heat exchanger 190H and, on a second side, the working fluid 202. For example, the boiler 210 can be configured to be in fluid communication, on a first side, with the buffer fluid from the first waste heat recovery heat exchanger 190J and, on a second side, the working fluid 202. In some implementations, the boiler 210 receives heat from the combustion of a fuel (for example, from the combustion of at least a portion of the carbon stream 113 in the presence of oxygen from at least a portion of the oxygen stream 115 in the power generation unit 150).

In some implementations, at least a portion of the power generated by the turbine 220 is used by a component of the system 100, 100G, or 100H. For example, at least a portion of the power generated by the turbine 220 can be provided to the electrolysis unit 140 to perform electrolysis on the water stream 103. For example, at least a portion of the power generated by the turbine 220 can be used to provide heat to the pyrolysis chamber 110 to perform pyrolysis on the hydrocarbon feed stream 101. In some implementations, at least a portion of the power generated by the turbine 220 is provided to another user. For example, at least a portion of the power generated by the turbine 220 can be used in another industrial process. For example, at least a portion of the power generated by the turbine 220 can be delivered to a power grid, where it can be stored and/or distributed to various users offsite. For example, at least a portion of the power generated by the turbine 220 can be provided to another process that is located onsite at the same facility as any of the systems 100, 100G, or 100H.

Figure 3:
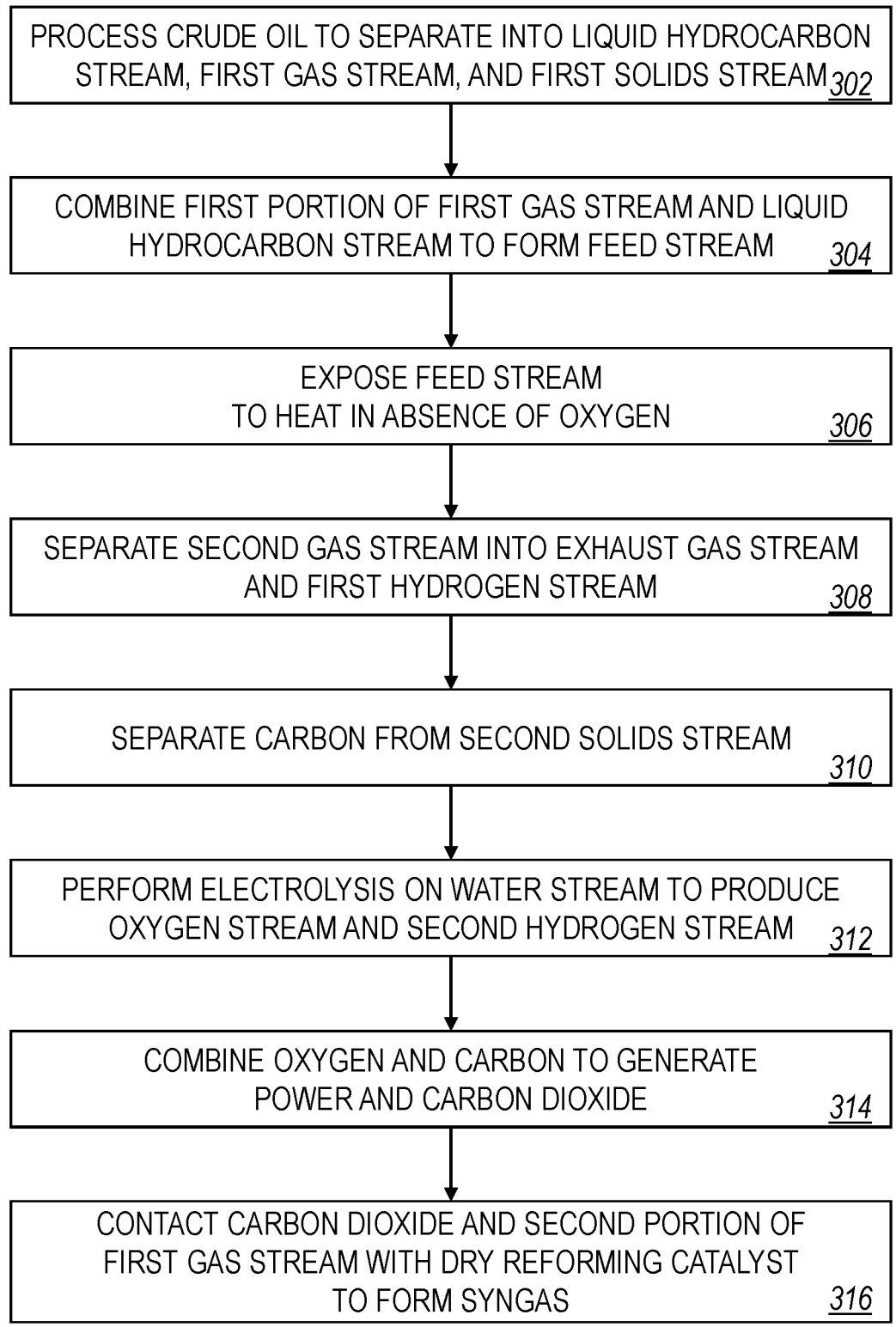
FIG. 3 is a flow chart of an example method for co-production of hydrogen, carbon, electricity, and carbon monoxide.

FIG. 3 is a flow chart of an example method 300 for co-production of hydrogen, carbon, carbon monoxide, electricity, and sequestration-ready carbon dioxide. Any of the systems 100, 100G, or 100H can be used to implement the method 300. At block 302, a crude oil is processed to separate the crude oil into a liquid hydrocarbon stream (such as the liquid hydrocarbon stream 171a), a first gas stream (such as the first gas stream 171b), and a first solids stream (such as the first solids stream 171c). The crude oil can be processed at block 302, for example, by the hydrocarbon processing unit 170A. At block 304, a first portion of the first gas stream 171b and the liquid hydrocarbon stream 171a are combined to form a hydrocarbon feed stream (such as the hydrocarbon feed stream 101). The hydrocarbon feed stream 101 is flowed to a pyrolysis chamber (such as the pyrolysis chamber 110). At block 306, the hydrocarbon feed stream 101 is exposed to heat (for example, within the pyrolysis chamber 110) in an absence of oxygen to convert the hydrocarbon feed stream 101 into a solids stream (such as the solids stream 105) and a gas stream (such as the gas stream 107). As mentioned previously, the solid stream 105 includes carbon, and the gas stream 107 includes hydrogen. The gas stream 107 is flowed from the pyrolysis chamber 110 to a gas separation unit (such as the gas separation unit 120). At block 308, the gas stream 107 is separated (for example, within the gas separation unit 120) into an exhaust gas stream (such as the exhaust gas stream 109) and a first hydrogen stream (such as the first hydrogen stream 111), which includes at least a portion of the hydrogen from the gas stream 107. The solids stream 105 is flowed from the pyrolysis chamber 110 to a carbon separation unit (such as the carbon separation unit 130). At block 310, the carbon is separated from the solids stream 105 (for example, within the carbon separation unit 130) to produce a carbon stream (such as the carbon stream 113). A water stream (such as the water stream 103) is flowed to an electrolysis unit (such as the electrolysis unit 140). Power is provided to the electrolysis unit 140. At block 312, electrolysis is performed on the water stream 103 (for example, by the electrolysis unit 140 in response to receiving power) to produce an oxygen stream (such as the oxygen stream 115) and a second hydrogen stream (such as the second hydrogen stream 117). At least a portion of the oxygen stream 115 is flowed from the electrolysis unit 140 to a power generation unit (such as the power generation unit 150). At least a portion of the carbon stream 113 is flowed from the carbon separation unit 130 to the power generation unit 150. As mentioned previously, the power generation unit 150 can, for example, include a direct carbon fuel cell 151. At block 314, the oxygen from the portion (or all) of the oxygen stream 115 and the carbon from the portion (or all) of the carbon stream 113 are combined (for example, by the direct carbon fuel cell 151) to generate power and a carbon dioxide stream (such as the carbon dioxide stream 119). At least a portion of the power generated at block 314 is used to perform electrolysis on the water stream 103 (block 312). Thus, at least a portion of the power used (for example, by the electrolysis unit 140) to perform electrolysis at block 312 is sourced from at least a portion of the power generated at block 314. In some implementations, at least a portion of the power generated at block 314 is used to perform pyrolysis on the hydrocarbon feed stream 101 (exposing the hydrocarbon feed stream 101 to heat at block 306). At block 316, the carbon dioxide stream 119 and a second portion of the first gas stream 171b are contacted with a dry reforming catalyst under dry reforming conditions to form a syngas stream (such as the syngas stream 173). Block 316 can be, for example, implemented by the dry reforming unit 170B. As mentioned previously, the syngas stream 173 includes carbon monoxide and hydrogen. In some implementations, at least a portion of the power generated at block 314 is used to produce the dry reforming conditions (block 316).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
processing a crude oil to separate the crude oil into a liquid hydrocarbon stream, a first gas stream, and a first solids stream, the first solids stream comprising carbon, the first gas stream comprising hydrogen and methane;
combining a first portion of the first gas stream and the liquid hydrocarbon stream to form a hydrocarbon feed stream;
exposing the hydrocarbon feed stream to heat in an absence of oxygen to convert the hydrocarbon feed stream into a second solids stream and a second gas stream, the second solids stream comprising carbon, the second gas stream comprising hydrogen;

separating the second gas stream into an exhaust gas stream and a first hydrogen stream comprising at least a portion of the hydrogen from the second gas stream;

separating the carbon from the second solids stream to produce a carbon stream;

performing electrolysis on a water stream comprising water to produce an oxygen stream and a second hydrogen stream, the oxygen stream comprising oxygen, the second hydrogen stream comprising hydrogen;

combining at least a portion of the oxygen of the oxygen stream and a second portion of the carbon of the carbon stream to generate power and a carbon dioxide stream comprising carbon dioxide; and contacting the carbon dioxide stream and a second portion of the first gas stream with a dry reforming catalyst under dry reforming conditions to form a syngas stream comprising carbon monoxide and hydrogen, wherein a first portion of the generated power is used to perform electrolysis on the water stream, a second portion of the generated power is used to expose the hydrocarbon feed stream to heat, and a third portion of the generated power is used to provide heat to produce the dry reforming conditions.

2. The method of claim 1, wherein the hydrocarbon feed stream comprises one or more C1-C22 alkanes, one or more C1-C22 alkenes, or any combination thereof.

3. The method of claim 2, wherein the dry reforming conditions comprise a dry reforming temperature in a range of from about 400 degrees Celsius (° C.) to about 1,000° C.

4. The method of claim 3, wherein the oxygen and the carbon are combined by a direct carbon fuel cell comprising a solid oxide, and the oxygen and the carbon are combined by the direct carbon fuel cell at an operating temperature in a range of from about 550° C. to about 900° C.

5. The method of claim 4, comprising transferring, by a first waste heat recovery heat exchanger, heat from the gas stream to a buffer fluid.

6. The method of claim 5, comprising transferring, by a second waste heat recovery heat exchanger, heat from the buffer fluid to the hydrocarbon feed stream prior to exposing the hydrocarbon feed stream to heat in the absence of oxygen.

7. The method of claim 5, comprising generating power by a Rankine cycle using the heat transferred from the second gas stream to the buffer stream, wherein generating power by the Rankine cycle comprises:

transferring heat from the buffer fluid to a working fluid in a boiler to vaporize the working fluid into a vaporized working fluid;

flowing and expanding the vaporized working fluid through a turbine to generate power;

condensing the vaporized working fluid into a condensed working fluid; and circulating the condensed working fluid to the boiler.

8. The method of claim 4, comprising transferring, by a first waste heat recovery heat exchanger, heat from the carbon dioxide stream to a buffer fluid.

9. The method of claim 8, comprising transferring, by a second waste heat recovery heat exchanger, heat from the buffer fluid to the hydrocarbon feed stream prior to exposing the hydrocarbon feed stream to heat in the absence of oxygen.

10. The method of claim 4, comprising sequestering, within a subterranean formation, the carbon dioxide stream generated by the direct carbon fuel cell, such that the carbon dioxide stream is not released to the atmosphere.

11. A system comprising:

a crude oil stream;

a hydrocarbon processing unit configured to receive and process the crude oil stream to separate the crude oil stream into a liquid hydrocarbon stream, a first gas stream, and a first solids stream, the first solids stream comprising carbon, the first gas stream comprising hydrogen and methane;

a pyrolysis chamber configured to receive the liquid hydrocarbon stream and a first portion of the first gas stream and expose the liquid hydrocarbon stream and the first portion of the first gas stream to heat in an absence of oxygen for conversion into a second solids stream comprising carbon and a second gas stream comprising hydrogen;

a gas separation unit configured to receive the second gas stream from the pyrolysis chamber and separate the hydrogen from the second gas stream to produce an exhaust gas stream and a first hydrogen stream comprising at least a portion of the hydrogen from the second gas stream;

a carbon separation unit configured to receive the second solids stream from the pyrolysis chamber and separate the carbon from the second solids stream to produce a carbon stream;

a water stream comprising water;

an electrolysis unit configured to receive the water stream and electrical power, the electrolysis unit configured to use the electrical power to perform electrolysis on the water stream to produce an oxygen stream comprising oxygen and a second hydrogen stream comprising hydrogen;

a power generation unit configured to receive at least a portion of the oxygen stream from the electrolysis unit and a second portion of the carbon stream from the carbon separation unit, the power generation unit comprising a direct carbon fuel cell configured to combine the oxygen from the portion of the oxygen stream and the carbon from the portion of the carbon stream to generate power and a carbon dioxide stream comprising carbon dioxide; and a dry reforming unit configured to receive the carbon dioxide stream from the power generation unit and a second portion of the first gas stream from the hydrocarbon processing unit, the dry reforming unit configured to contact the carbon dioxide stream and the second portion of the first gas stream with a dry reforming catalyst under dry reforming conditions to form a syngas stream comprising carbon monoxide and hydrogen, wherein a first portion of the power generated by the power generation unit is provided to the electrolysis unit to perform electrolysis on the water stream, a second portion of the power generated by the power generation unit is provided to the pyrolysis chamber to expose the liquid hydrocarbon stream and the first portion of the first gas stream to heat, and a third portion of the power generated by the power generation unit is provided to the dry reforming unit to produce the dry reforming conditions.

12. The system of claim 11, wherein the hydrocarbon feed stream comprises one or more C1-C22 alkanes, one or more C1-C22 alkenes, or any combination thereof.

13. The system of claim 12, wherein the dry reforming conditions comprise a dry reforming temperature in a range of from about 400 degrees Celsius (° C.) to about 1,000° C.

14. The system of claim 13, wherein the direct carbon fuel cell comprises a solid oxide electrolyte configured to operate at a temperature in a range of from about 550° C. to about 900° C.

15. The system of claim 14, comprising a first waste heat recovery heat exchanger in fluid communication with the gas stream exiting the pyrolysis chamber and a buffer fluid, the first waste heat recovery heat exchanger configured to transfer heat from the gas stream to the buffer fluid.

16. The system of claim 15, comprising a second waste heat recovery heat exchanger in fluid communication with the hydrocarbon feed stream entering the pyrolysis chamber and the buffer fluid, the second waste heat recovery heat exchanger configured to transfer the heat from the buffer fluid to the hydrocarbon feed stream prior to the hydrocarbon feed stream entering the pyrolysis chamber.

17. The system of claim 15, comprising a Rankine cycle configured to generate power using the heat transferred from the second gas stream to the buffer fluid, the Rankine cycle comprising:
- a boiler configured to receive a working fluid and the buffer fluid, the boiler configured to transfer heat from the buffer fluid to the working fluid to vaporize the working fluid into a vaporized working fluid;
- a turbine configured to receive the vaporized working fluid and generate power as the vaporized working fluid flows and expands through the turbine;
- a condenser configured to receive and condense the vaporized working fluid into a condensed working fluid; and
- a pump configured to circulate the condensed working fluid to the boiler.

18. The system of claim 14, comprising a first waste heat recovery heat exchanger in fluid communication with the carbon dioxide stream exiting the power generation unit and a buffer fluid, the first waste heat recovery heat exchanger configured to transfer heat from the carbon dioxide stream to the buffer fluid.

19. The system of claim 18, comprising a second waste heat recovery heat exchanger in fluid communication with the hydrocarbon feed stream entering the pyrolysis chamber and the buffer fluid, the second waste heat recovery heat exchanger configured to transfer the heat from the buffer fluid to the hydrocarbon feed stream prior to the hydrocarbon feed stream entering the pyrolysis chamber.

20. The system of claim 14, wherein the pyrolysis chamber comprises a catalyst comprising at least one of activated carbon, carbon black, cobalt, iron, copper, or nickel.

* * * * *